United States Patent
Seo

(10) Patent No.: US 10,962,435 B2
(45) Date of Patent: Mar. 30, 2021

(54) BREATHABLE WATERPROOF SHEET

(71) Applicant: AMOGREENTECH CO., LTD., Gimpo-si (KR)

(72) Inventor: In-Yong Seo, Seoul (KR)

(73) Assignee: AMOGREENTECH CO., LTD., Gyeonggi-Do (KR)

( * ) Notice: Subject to any disclaimer, the term of this patent is extended or adjusted under 35 U.S.C. 154(b) by 116 days.

(21) Appl. No.: 16/314,834

(22) PCT Filed: Jun. 30, 2017

(86) PCT No.: PCT/KR2017/006982
§ 371 (c)(1),
(2) Date: Jan. 2, 2019

(87) PCT Pub. No.: WO2018/008907
PCT Pub. Date: Jan. 11, 2018

(65) Prior Publication Data
US 2019/0310155 A1  Oct. 10, 2019

(30) Foreign Application Priority Data
Jul. 8, 2016 (KR) .................. 10-2016-0086632

(51) Int. Cl.
*G01L 19/14* (2006.01)
*B32B 3/26* (2006.01)
(Continued)

(52) U.S. Cl.
CPC .............. *G01L 19/145* (2013.01); *B32B 3/26* (2013.01); *B32B 7/12* (2013.01); *B32B 27/08* (2013.01);
(Continued)

(58) Field of Classification Search
CPC ..................................................... G01L 19/145
(Continued)

(56) References Cited

U.S. PATENT DOCUMENTS

| 2007/0082189 A1* | 4/2007 | Gillette ............... B32B 5/18 |
| | | 428/304.4 |
| 2011/0209265 A1 | 9/2011 | Komada et al. |

(Continued)

FOREIGN PATENT DOCUMENTS

| CN | 102186368 A | 9/2011 |
| JP | 2012-253481 A | 12/2012 |

(Continued)

OTHER PUBLICATIONS

Chinese Office Action 2020042301885020.

*Primary Examiner* — Brent T O'Hern
(74) *Attorney, Agent, or Firm* — CL Intellectual LLC

(57) ABSTRACT

A breathable waterproof sheet, which interposes a support layer having a plurality of holes formed therein, thus preventing a waterproof air-permeable layer from colliding with a pressure sensor by a water pressure. The breathable waterproof sheet includes a waterproof air-permeable layer formed of a film having elasticity, an adhesive layer having one surface adhered to one surface of the waterproof air-permeable layer, and a support layer having a plurality of air-permeable holes formed therein and having one surface adhered to the other surface of the adhesive layer.

6 Claims, 4 Drawing Sheets

(51) Int. Cl.
*B32B 7/12* (2006.01)
*B32B 27/08* (2006.01)
*H04M 1/03* (2006.01)
*H04R 1/44* (2006.01)
*H04R 1/02* (2006.01)
*H04M 1/18* (2006.01)
*H04R 1/08* (2006.01)

(52) U.S. Cl.
CPC ............... *H04M 1/03* (2013.01); *H04M 1/18* (2013.01); *H04R 1/02* (2013.01); *H04R 1/08* (2013.01); *H04R 1/44* (2013.01); *B32B 2307/724* (2013.01); *B32B 2307/7265* (2013.01)

(58) Field of Classification Search
USPC ........................................................ 428/137
See application file for complete search history.

(56) References Cited

U.S. PATENT DOCUMENTS

| | | | |
|---|---|---|---|
| 2014/0079268 A1* | 3/2014 | Karube | ............... H04R 1/02 381/334 |
| 2014/0283691 A1 | 9/2014 | Furuuchi | |
| 2015/0259900 A1 | 9/2015 | Humphreys et al. | |
| 2016/0207006 A1 | 7/2016 | Furuyama et al. | |

FOREIGN PATENT DOCUMENTS

| | | |
|---|---|---|
| JP | 2016-34105 A | 3/2016 |
| KR | 10-1213140 B1 | 12/2012 |
| KR | 10-1436100 B1 | 9/2014 |
| KR | 10-1460303 B1 | 11/2014 |
| KR | 10-2016-0052593 A | 5/2016 |
| TW | 2015-01780 A | 1/2015 |

* cited by examiner

[FIG. 1]
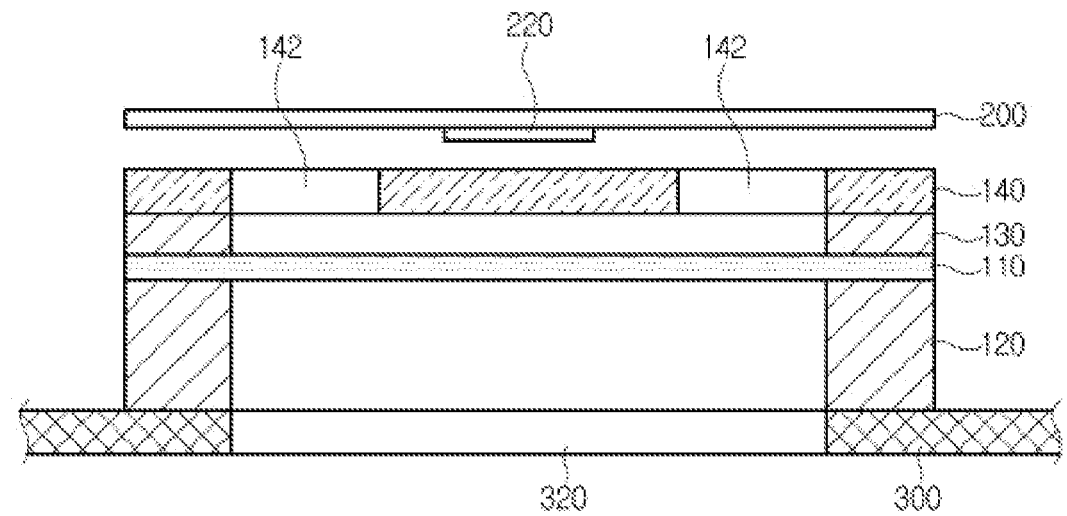
[FIG. 2]
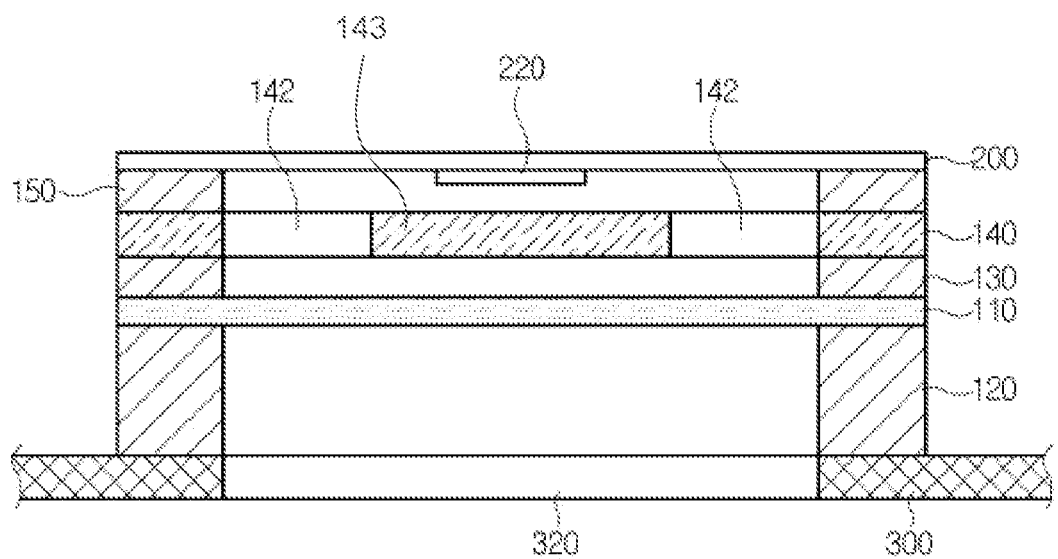

[FIG. 3]
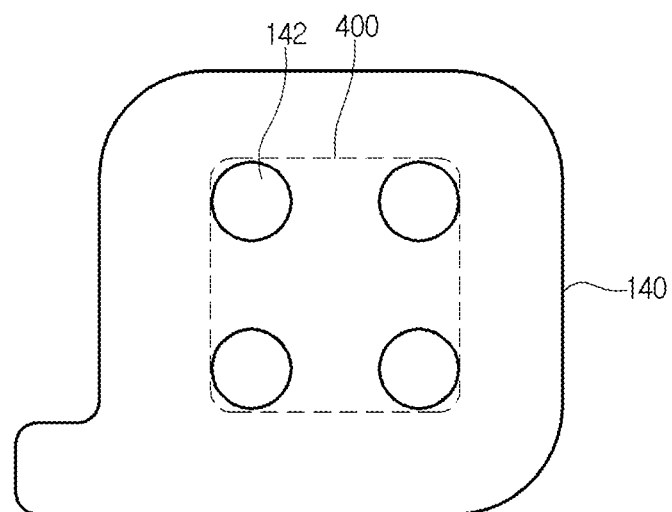
[FIG. 4]
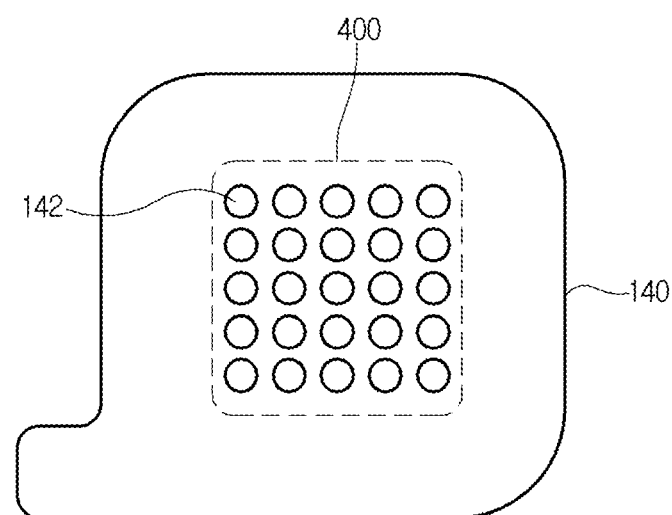

[FIG. 5]
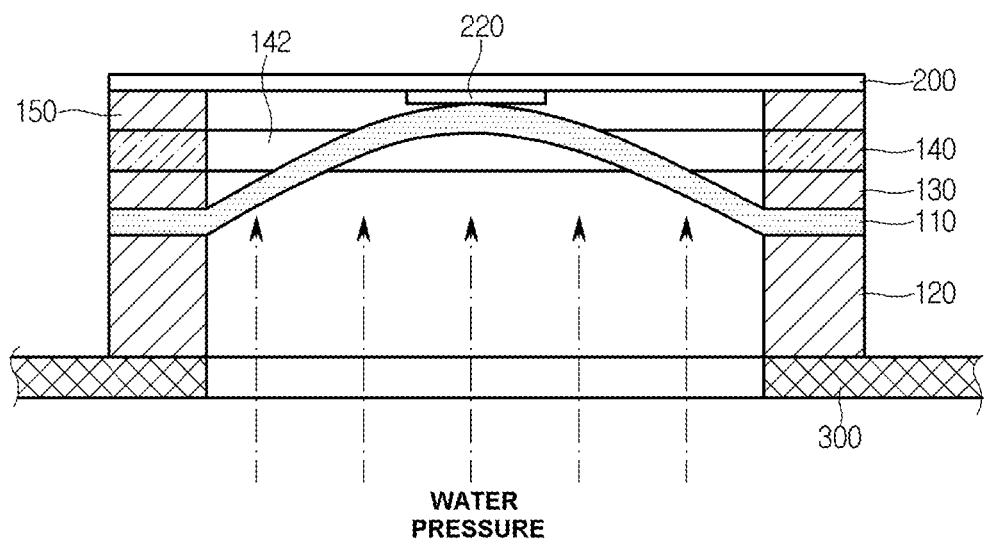
[FIG. 6]
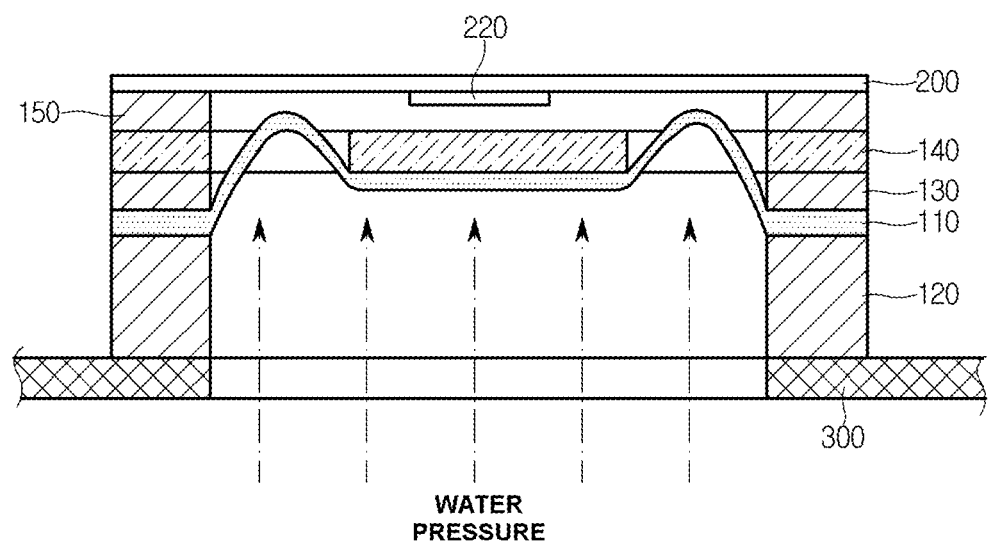

[FIG. 7]
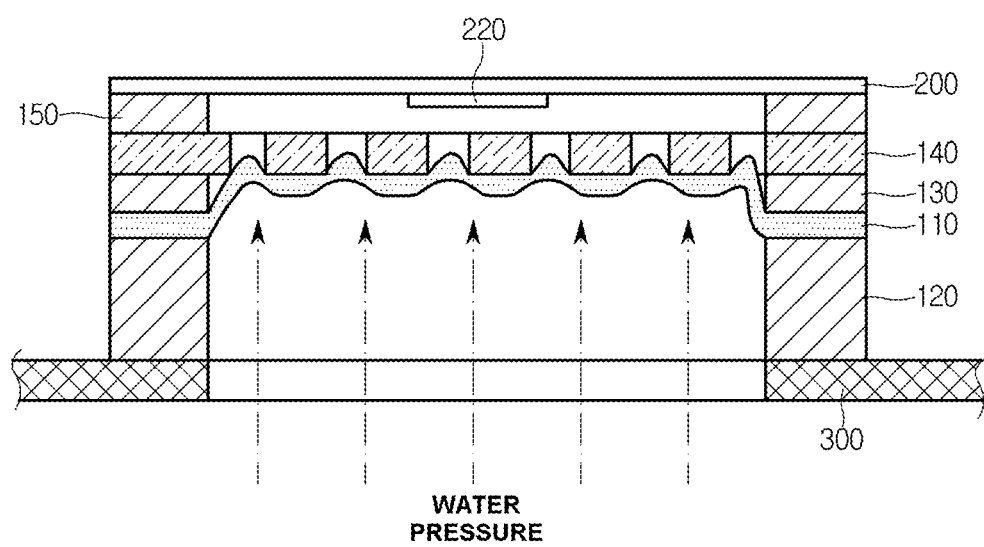

BREATHABLE WATERPROOF SHEET

CROSS-REFERENCE TO RELATED APPLICATIONS

This application is a National Stage of International patent application PCT/KR2017/006982, filed on Jun. 30, 2017, which claims priority to foreign Korean patent application No. 10-2016-0086632 filed on Jul. 8, 2016, the disclosures of which are incorporated by reference in their entirety.

FIELD OF THE INVENTION

The present disclosure relates to a breathable waterproof sheet, and more particularly, to a breathable waterproof sheet, which prevents water from being introduced into a pressure sensor mounted in a portable terminal, and permeates air.

BACKGROUND

In recent years, mobile electronic appliances, such as a portable terminal, a digital camera, and a notebook, have increasingly been used. Such a mobile electronic appliance needs to have waterproof function because it is for portable use.

However, an air-permeable hole for permeating air is formed in a portion where a pressure sensor (e.g., altitude sensor) used for altitude measurement, etc. is installed, and water or dust permeates into the electronic appliance through the air-permeable hole.

Therefore, a breathable waterproof sheet for permeating air and blocking water or dust is installed on the air-permeable hole. Such a breathable waterproof sheet should be manufactured considering both waterproof performance and air-permeable performance.

Generally, the breathable waterproof sheet is formed in a structure similar to a waterproof sound-transmitting sheet installed in a microphone, a speaker, etc. of a portable terminal. That is, the breathable waterproof sheet is composed of a waterproof air-permeable film formed of a porous film for air-permeation.

However, there is a problem in that in the conventional breathable waterproof sheet, when a water pressure of a certain level or more is applied thereto, the collision between a waterproof air-permeable film stretched by the water pressure and the pressure sensor occurs, thus causing a malfunction of the pressure sensor.

In addition, there is a problem in that the conventional breathable waterproof sheet may cause a malfunction of the pressure sensor, thus providing false information to the portable terminal.

SUMMARY OF THE INVENTION

The present disclosure is intended to solve the above problems, and an object of the present disclosure is to provide a breathable waterproof sheet, which interposes a support layer having a plurality of holes formed therein between a waterproof air-permeable layer and a pressure sensor, thus preventing the waterproof air-permeable layer from colliding with the pressure sensor by a water pressure.

For achieving the object of the present disclosure, a breathable waterproof sheet according to an embodiment of the present disclosure includes a waterproof air-permeable layer formed of a film having elasticity, a support layer having a plurality of air-permeable holes formed therein and disposed on one surface of the waterproof air-permeable layer, and an adhesive layer interposed between the waterproof air-permeable layer and the support layer to be adhered to the waterproof air-permeable layer and the support layer.

The support layer may be formed of a porous film and the plurality of air-permeable holes may be formed in the porous film. At this time, the plurality of air-permeable holes may be formed in the support layer, and may be formed in an area that does not contact with the adhesive layer.

The adhesive layer may have a hole formed therein to separate the waterproof air-permeable layer and the support layer, and may be disposed along the outer circumferences of the waterproof air-permeable layer and the support layer to form a spacing space between the waterproof air-permeable layer and the support layer. At this time, the adhesive layer may be adhered to the support layer along the outer circumference of the plurality of air-permeable holes.

According to the present disclosure, it is possible for the breathable waterproof sheet to interpose the support layer having the plurality of air-permeable holes formed therein between the pressure sensor and the waterproof air-permeable layer, thus preventing the waterproof air-permeable layer stretched by the water pressure from contacting with the pressure sensor.

In addition, it is possible for the breathable waterproof sheet to form the plurality of air-permeable holes having the size of a setting size or more along the circumference of the area of the support layer that is not adhered to the adhesive layer, thus preventing the waterproof air-permeable layer stretched by the water pressure from contacting with the pressure sensor.

In addition, it is possible for the breathable waterproof sheet to form the plurality of air-permeable holes having the size smaller than the setting size in the area of the support layer that is not adhered to the adhesive layer, thus preventing the waterproof air-permeable layer stretched by the water pressure from contacting with the pressure sensor.

In addition, it is possible for the breathable waterproof sheet to prevent the waterproof air-permeable layer from contacting with the pressure sensor, thus preventing a malfunction of the pressure sensor.

BRIEF DESCRIPTION OF THE DRAWINGS

FIGS. 1 to 7 are diagrams for explaining a breathable waterproof sheet according to an embodiment of the present disclosure.

DETAILED DESCRIPTION

Hereinafter, the most preferred embodiment of the present disclosure will be described with reference to the accompanying drawings so that those skilled in the art to which the present disclosure pertains may easily practice the technical spirit of the present disclosure. First, in adding reference numerals to the components in each drawing, it is to be noted that the same components are denoted by the same reference numerals even though they are illustrated in different drawings. In addition, in the following description of the present disclosure, a detailed description of known configurations or functions will be omitted when it is determined to obscure the subject matter of the present disclosure.

Referring to FIG. 1, a breathable waterproof sheet 100 is configured to include a waterproof air-permeable layer 110, a first adhesive layer 120, a second adhesive layer 130, and a support layer 140. At this time, referring to FIG. 2, the breathable waterproof sheet 100 may be configured to further include a third adhesive layer having the lower surface adhered to the upper surface of the support layer 140, and having the upper surface adhered to a pressure sensor module 200, where a portion 143 of the support layer 140 and the plurality of air-permeable holes 142 are formed in an area that is not adhered with the adhesive layer 130, and where the adhesive layer 130 forms a spacing space between the waterproof air-permeable layer 142 and the portion of the support layer 140.

The waterproof air-permeable layer 110 is formed of a thin film in a predetermined shape. At this time, the waterproof air-permeable layer 110 is formed of a thin film in various shapes such as a circular shape, an elliptical shape, a square shape, and a hexagonal shape according to a hole 320 formed in a portable terminal for introducing air into a pressure sensor 220, an internal coupling structure thereof, etc.

Generally, since the portable terminal to which the breathable waterproof sheet is applied has the air-permeable hole 142 in a very small circular shape, the waterproof air-permeable layer 110 is mainly formed in a circular shape or an elliptical shape.

In addition, the waterproof air-permeable layer 110 may be formed of a thin film having a thickness of about 30 μm according to air-permeable and waterproof performance required by the portable terminal. At this time, the waterproof air-permeable layer 110 may also be formed in a thickness of 5 μm or less and 100 μm or more considering a thickness of the portable terminal.

The waterproof air-permeable layer 110 may be composed of a porous membrane formed through electrospinning in order to provide waterproof and air-permeable performance. For example, the waterproof air-permeable layer 110 may be formed in a high elastic porous film shape by electrospinning a polymer material and forming a polymer material layer on a web.

Herein, the polymer material can use aromatic polyesters such as polyamide, polyimide, polyamideimide, poly(metaphenylene isophthalamide), polysulfone, polyetherketone, polyetherimide, polyethylene terephthalate, polytrimethylene terephthalate, and polyethylene naphthalate, polyphosphazenes such as polytetrafluoroethylene, polydiphenoxaphospazene, and poly {bis[2-(2-methoxyethoxy) phosphazene]}, polyurethane copolymers containing polyurethane and polyetherurethane, cellulose acetate, cellulose acetate butyrate, cellulose acetate propionate, etc. In addition, it can use polyvinylidene fluoride (PVDF), poly(vinylidene fluoride-co-hexafluoropropylene), perfluoropolymers, polyvinyl chloride or polyvinylidene chloride, and copolymers thereof, and polyethyleneglycol derivatives containing polyethyleneglycol dialkyl ether and polyethyleneglycol dialkyl ester, polyoxides containing poly(oxymethylene-oligo-oxyethylene), polyethylene oxide, and polypropylene oxide, polyacrylonitrile copolymers containing polyvinyl acetate, poly (vinylpyrrolidone-vinyl acetate), polystyrene and polystyrene acrylonitrile copolymers, polyacrylonitrile, polyacrylonitrile methyl methacrylate copolymers, poly methylmethacrylate; polymethyl methacrylate copolymer and a mixture thereof.

The waterproof air-permeable layer 110 is formed by electrospinning so that the thickness thereof is easily adjusted. Particularly, the thickness of the waterproof air-permeable layer 110 is formed by using an electrospinning process easily and thinly, thus forming the breathable waterproof sheet having entire excellent air-permeable performance.

The waterproof air-permeable layer 110 may also be composed of a high elasticity (high stretch-shrinkage performance) and porous material manufactured by a method other than electrospinning in order to provide waterproof performance. For example, the waterproof air-permeable layer 110 may be formed of nonwoven fabric formed of at least one among polyethylene terephthalate (PET), polypropylene (PP), polyethylene (PE), and Nylon.

Of course, the waterproof air-permeable layer 110 may be formed of a porous material such as polytetrafluoroethylene (PTFE).

The first adhesive layer 120 is formed of a thin film in a predetermined shape having a hole therein. At this time, the first adhesive layer 120 may be formed of a thin film in various shapes such as a circular shape, an elliptical shape, a square shape, and a hexagonal shape according to the shape of the waterproof air-permeable layer 110.

The first adhesive layer 120 is formed of a thin film having a predetermined thickness for securing a spacing distance between a case 300 of the portable terminal and the waterproof air-permeable layer 110. That is, the first adhesive layer 120 has the lower surface adhered to the case 300 of the portable terminal, and has the upper surface adhered to the lower surface of the waterproof air-permeable layer 110 to be interposed between the case 300 of the portable terminal and the waterproof air-permeable layer 110. At this time, the first adhesive layer 120 may be formed to have a thickness of about 150 μm for securing a spacing interval between the case 300 of the portable terminal and the waterproof air-permeable layer 110.

The second adhesive layer 130 is formed of a thin film in a predetermined shape having a hole therein. That is, the second adhesive layer 130 may be formed of a thin film in various shapes such as a circular shape, an elliptical shape, a square shape, and a hexagonal shape according to the shape of the waterproof air-permeable layer 110. At this time, the second adhesive layer 130 has a hole for air-permeable formed therein.

Therefore, the second adhesive layer 130 is disposed along the outer circumferences of the waterproof air-permeable layer 110 and the support layer 140 to form a spacing space (i.e., hole) between the waterproof air-permeable layer 110 and the support layer 140. At this time, the second adhesive layer 130 is adhered to one surface of the support layer 140 along the outer circumference of the plurality of air-permeable holes 142 formed in the support layer 140.

The second adhesive layer 130 is formed of a thin film having a predetermined thickness for securing a spacing distance between the waterproof air-permeable layer 110 and the support layer 140. That is, the second adhesive layer 130 has the lower surface adhered to the upper surface of the waterproof air-permeable layer 110, and has the upper surface adhered to the lower surface of the support layer 140 to be interposed between the waterproof air-permeable layer 110 and the support layer 140. At this time, the second adhesive layer 130 may be formed to have a thickness of about 50 μm to 200 μm for securing a spacing interval between the waterproof air-permeable layer 110 and the support layer 140.

The support layer 140 is formed in a predetermined shape to have the lower surface adhered to the upper surface of the second adhesive layer 130. The support layer 140 is formed of a thin film in various shapes such as a circular shape, an elliptical shape, a square shape, and a hexagonal shape according to the air-permeable hole 142 of the portable terminal, the internal coupling structure thereof, etc.

The support layer 140 is disposed to be spaced at a predetermined interval apart from the waterproof air-permeable layer 110 in order to prevent the waterproof air-permeable layer 110 from being stretched at a certain level or more as a water pressure is applied thereto. At this time, the support layer 140 forms a spacing interval with the waterproof air-permeable layer 110 by the thickness of the second adhesive layer.

The support layer 140 may be formed to have a thickness of about 50 μm according to air-permeable performance and waterproof performance required by the portable terminal. At this time, the support layer 140 is formed to have air permeability of about 10 cfm or more.

For this purpose, the support layer 140 is formed of a porous material having a plurality of pores formed therein in order to provide air-permeable performance. That is, the support layer 140 is generally formed of a porous material having the micropores formed therein for blocking water and permeating air such as nonwoven fabric or a porous film.

At this time, the support layer 140 is formed with a plurality of pores having the size (diameter) of about 2 μm to 20 μm. At this time, the plurality of pores are preferably formed to have air permeability of 10 μm or more.

For example, the support layer 140 is composed of nonwoven fabric formed of a material such as polyethylene terephthalate (PET), polypropylene (PP), polyethylene (PE), or Nylon, a porous membrane formed through electrospinning, or a porous material having a plurality of pores formed therein such as polytetrafluoroethylene (PTFE).

At this time, the support layer 140 may be formed to have a diameter of fiber constituting nonwoven fabric of about 1 μm or more and 10 μm or less. Herein, the support layer 140 may be generally composed of a thin film, of a nonwoven fabric material composed of the fiber having a diameter of about 5 μm.

The support layer 140 may also be formed of a nonporous material having no elasticity such as PET. That is, the support layer 140 may be composed of a nonporous membrane formed through electrospinning or a nonporous material manufactured by a method other than the electrospinning.

For example, the support layer 140 may be composed of a material such as polyethylene terephthalate (PET), polypropylene (PP), polyethylene (PE), or Nylon.

In addition, various materials may be used that satisfy a certain level or more of strength property, elasticity property, etc.

When the support layer 140 is formed of a nonporous material, the support layer 140 has the plurality of air-permeable holes 142 formed therein. That is, when the support layer 140 is formed of a nonporous material, the support layer 140 does not permeate air into the pressure sensor 220, such that the plurality of air-permeable holes 142 formed to have a predetermined size (diameter) are formed therein. Therefore, the air permeates into the pressure sensor 220 through the plurality of air-permeable holes 142.

At this time, FIG. 3 is a diagram illustrating one surface of the support layer 140 when facing the pressure sensor module 200, and when the size (i.e., diameter) of the air-permeable hole 142 is equal to or greater than a reference value, the support layer 140 has the plurality of air-permeable holes 142 formed along the outer circumference of an area 400 corresponding to the inner circumference of the second adhesive layer 130 (i.e., an area not adhered to the second adhesive layer 130).

This is to prevent the waterproof air-permeable layer 110 stretched through the air-permeable hole 142 from colliding with the pressure sensor 220, and since the pressure sensor module 200 has the pressure sensor 220 attached to the center of a substrate, the support layer 140 has the plurality of air-permeable holes 142 formed along the outer circumference of the area corresponding to the inner circumference of the second adhesive layer 130.

Meanwhile, FIG. 4 is a diagram illustrating one surface of the support layer 140 when facing the pressure sensor module 200, and when the size (i.e., diameter) of the air-permeable hole 142 is smaller than the reference value, the support layer 140 has the plurality of air-permeable holes 142 formed in the area 400 corresponding to the inner circumference of the second adhesive layer 130.

At this time, when the size of the air-permeable hole 142 is smaller than the reference value, it is possible to prevent the waterproof air-permeable layer 110 from colliding with the pressure sensor 220 even when the waterproof air-permeable layer 110 is stretched by a water pressure.

Generally, as the amount of air permeating through the breathable waterproof sheet increases, pressure sensing performance of the pressure sensor is improved, such that it is necessary to increase the size of the air-permeable holes 142 formed in the support layer 140.

However, as illustrated in FIG. 5, when a water pressure is applied to the breathable waterproof sheet in a state where the size of the air-permeable hole 142 is formed to include the entire area corresponding to the inner circumference of the second adhesive layer 130, the waterproof air-permeable layer 110 stretched by the water pressure contacts with the pressure sensor 220, thus causing a malfunction of the pressure sensor 220.

On the contrary, as, illustrated in FIG. 6, when the plurality of air-permeable holes 142 having the size of a reference value or more are formed along the outer circumference of the area corresponding to the inner circumference of the second adhesive layer 130 in the support layer 140, the waterproof air-permeable layer 110 stretched by the water pressure is close to the pressure sensor module 200 but does not contact with the pressure sensor 220 disposed at the center of the module, thus not causing a malfunction of the pressure sensor 220.

In addition, as illustrated in FIG. 7, when the plurality of air-permeable holes 142 having the size smaller than the reference value are formed in the area corresponding to the inner circumference of the second adhesive layer 130 in the support layer 140, the waterproof air-permeable layer 110 stretched by the water pressure is not close to the pressure sensor module 200 by the narrow air-permeable hole 142, thus not causing a malfunction of the pressure sensor 220.

Herein, although it has been explained in the above description that the air-permeable hole 142 is formed only when the support layer 140 is formed of a nonporous material, it is not limited thereto and may also be applied to the support layer 140 of a porous material for ensuring air-permeable performance.

It is possible for the breathable waterproof sheet to interpose the support layer having the plurality of air-permeable holes formed therein between the pressure sensor and the waterproof air-permeable layer, thus preventing the waterproof air-permeable layer stretched by a water pressure from contacting with the pressure sensor.

In addition, it is possible for the breathable waterproof sheet to form the plurality of air-permeable holes having the size of a setting size or more along the circumference of the area of the support layer that is not adhered to the adhesive layer, thus preventing the waterproof air-permeable layer stretched by the water pressure from contacting with the pressure sensor.

In addition, it is possible for the breathable waterproof sheet to form the plurality of air-permeable holes having the size smaller than the setting size in the area of the support layer that is not adhered to the adhesive layer, thus preventing the waterproof air-permeable layer stretched by the water pressure from contacting with the pressure sensor.

In addition, it is possible for the breathable waterproof sheet to prevent the waterproof air-permeable layer from contacting with the pressure sensor, thus preventing a malfunction of the pressure sensor.

As described above, although preferred embodiments according to the present disclosure have been described, it is to be understood that they may be modified into various forms, and various modifications and changes thereof may be embodied by those skilled in the art without departing from the scope of the present disclosure.

The invention claimed is:

1. A breathable waterproof sheet, comprising:
a waterproof air-permeable layer formed of a film having elasticity;
a support layer having a plurality of air-permeable holes formed therethrough and disposed on one surface of the waterproof air-permeable layer; and
an adhesive layer interposed between the waterproof air-permeable layer and the support layer to be adhered to the waterproof air-permeable layer and the support layer,
wherein a portion of the support layer and the plurality of air-permeable holes are formed in an area that is not adhered with the adhesive layer, and
wherein the adhesive layer forms a spacing space between the waterproof air-permeable layer and the portion of the support layer.

2. The breathable waterproof sheet of claim 1, wherein the support layer is formed of a porous film, and the plurality of air-permeable holes are formed in the porous film.

3. The breathable waterproof sheet of claim 1, wherein the plurality of air-permeable holes are formed in the support layer, and are formed in an area that is not adhered with the adhesive layer.

4. The breathable waterproof sheet of claim 1, wherein the adhesive layer has a hole formed therein to separate the waterproof air-permeable layer and the support layer.

5. The breathable waterproof sheet of claim 1, wherein the adhesive layer is disposed along outer circumferences of the waterproof air-permeable layer and the support layer.

6. The breathable waterproof sheet of claim 1, wherein the adhesive layer is adhered to the support layer along outer circumferences of the plurality of air-permeable holes.

* * * * *